United States Patent [19]
Turion

[11] 4,100,936
[45] Jul. 18, 1978

[54] THREE-WAY HYDRAULIC VALVE

[75] Inventor: Jean-Claude Turion, Paulhan, France

[73] Assignee: Irrifrance, Paulhan, France

[21] Appl. No.: 686,810

[22] Filed: May 17, 1976

[30] Foreign Application Priority Data

May 30, 1975 [FR] France .................. 75 17354

[51] Int. Cl.² .............. F15B 13/04; F16K 11/14
[52] U.S. Cl. ...................... 137/596.2; 91/442; 91/451; 137/625.27
[58] Field of Search ............. 91/442, 268, 265, 271, 91/451, 457, 755; 137/596.2, 625.27

[56] References Cited
U.S. PATENT DOCUMENTS

| 78,518 | 6/1868 | Enggren | 91/265 X |
| 627,903 | 6/1889 | Cash | 137/596.2 X |
| 906,331 | 12/1908 | Struble et al. | 137/625.27 |
| 1,015,132 | 1/1912 | Bower | 137/625.27 |
| 2,240,163 | 4/1941 | Pick | 137/596.2 |
| 2,478,002 | 8/1949 | Mott | 91/457 X |
| 2,991,800 | 7/1961 | Becker | 137/596.2 |
| 3,187,637 | 6/1965 | Edmund | 91/442 X |

Primary Examiner—Irwin C. Cohen
Attorney, Agent, or Firm—Lewis H. Eslinger

[57] ABSTRACT

This invention relates to a three-way hydraulic valve, stable in two positions, intended for distributing a liquid containing impurities, comprising a ball valve whose ball is located in the first way, the inlet for said liquid, and has a seat located between the first and the second way, the pressure of said liquid applying said ball on said seat, a conical needle valve, a calibrated spring applying said needle on a seat located between the second and third way, said seat being of diameter smaller than that of the seat of said ball valve, and a manoeuvring rod outside the valve body, with which said needle is fast and which comprises an extension abutting on said ball and maintaining it open when the needle is closed.

3 Claims, 5 Drawing Figures

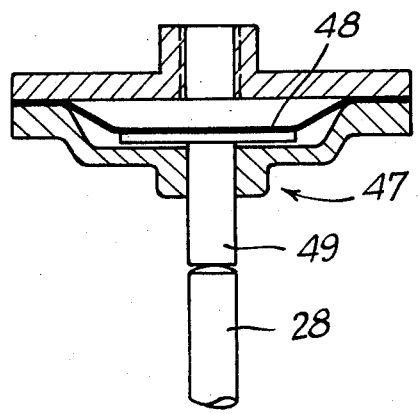
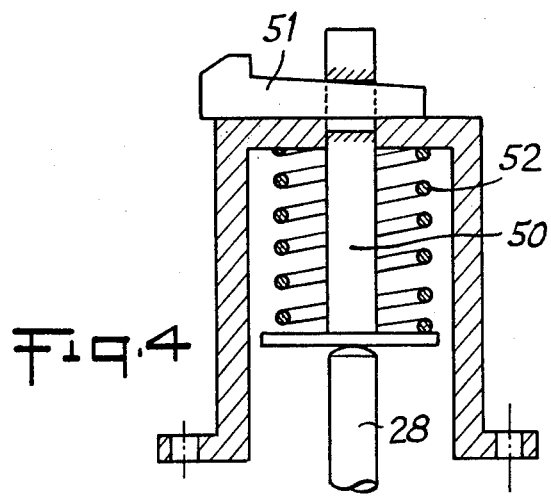
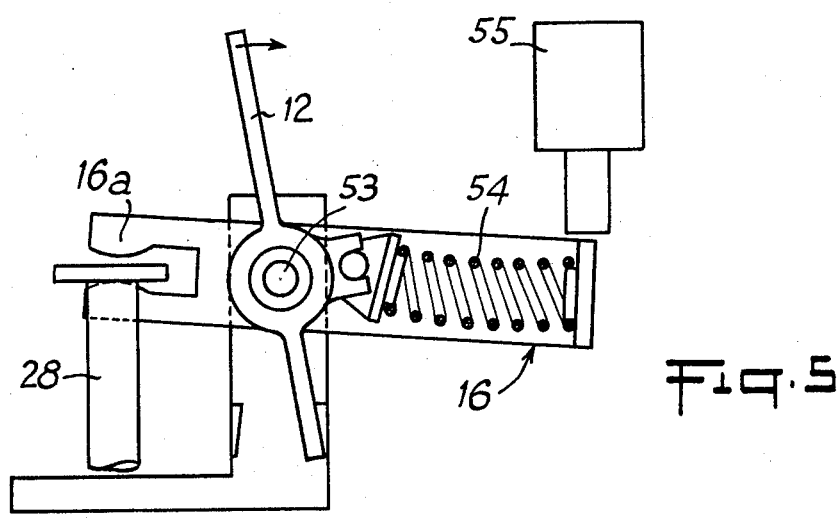

THREE-WAY HYDRAULIC VALVE

The present invention relates to a three-way hydraulic valve intended for distributing a liquid containing impurities, particularly water for irrigating purposes.

The technical sector in question is that of the construction of hydraulic circuits used on irrigating apparatus.

Several types of self-moving apparatus for irrigating fields exist. It is advantageous if the motors on the one hand and the automatic devices, with which these apparatus are equipped, on the other hand, can be moved by the irrigation water itself so that the apparatus is entirely self-contained.

Such is the case for example of the distributors displaced by a movement of translation or a movement of rotation about a pivot.

Such is also the case of apparatus comprising a drum around which a supple hose is wound, at the end of which hose is placed a sled carrying an irrigation apparatus. In this latter case, the drum is rotated at low speed during the whole irrigation operation and it is advantageous to drive it by hydraulic motor actuated by the pressure of the irrigation water.

These apparatus comprise automatic devices which control the beginning and end of irrigation, the draining of the hose, the alternate movements of the hose winding guide; it is also advantageous to use the energy of the irrigation water to control these automatic devices.

Up to the present time, single or double effect piston jacks have been used as hydraulic motor, but the functioning of these jacks with water containing impurities is very defective.

To remedy this drawback, deformable jacks have been used, constituted by a supple envelope, in the form of bellows, which is alternately inflated with water, then deflated through a rapid exhaust valve.

These jacks present the advantage of being able to be fed with water containing impurities. However, they must be associated with a three-way valve which successively controls the feed of the jack then the exhaust of said latter and the opening of the rapid exhaust valve. This three-way valve is itself controlled by a rocking lever whose rocking motions are controlled by the movement of the jack when it arrives at the end of its stroke.

Commercially available valves have heretofore been used as three-way valve, which have two flaps of opposite direction, mounted on the same axis, associated with a spring outside the valve, which acts on the control rod of said latter, and which is calibrated as a function of the pressure of the irrigation water.

These valves are designed neither for this particular application, nor for conveying water containing impurities and the operational defects which disappeared at the level of the jack remain at the level of the valves.

It is an object of the present invention to provide new hydraulic three-way valves which are especially suitable for this particular application, since they are able to convey water containing impurities, they are "bistable", i.e. are stable in two positions, and require only a low force of short duration to make them pass from one position of equilibrium to the other and they may remain unused for periods of several months, this corresponding to the seasonal functioning of the irrigation apparatus.

Another object of the invention is to provide valves that may be used in association with electrical, hydraulic or mechanical end of stroke controls, in order to obtain, with a low expenditure of energy, the automatic closure or opening of circuits in which irrigation water circulates and in order to maintain the circuits in this position until a new pulse is received.

These aims are attained by means of a three-way valve comprising a ball valve whose ball is located in the inlet way for the liquid and is applied by the pressure of the liquid on a seat located between the first and second way and a conical needle valve which is applied by a calibrated spring onto a seat, located between the second and third way, whose diameter is smaller than the diameter of the seat of the ball valve, which needle is fast with a manoeuvring rod outside the valve body, which comprises an extension abutting on said ball and maintaining it open when the needle is closed.

The manoeuvring rod is fixed at the centre of a deformable, tight membrane which separates the cavity, in which the liquid circulates, from the housing of said calibrated spring.

The compression of said spring is so adjusted that the force that it exerts is lower than the thrust necessary for opening the ball when it is maintained closed by the pressure of the liquid and greater than the thrust exerted by the liquid on the needle when it is closed, with the result that the said valve is "bistable", i.e. stable in two positions.

A valve according to the invention comprises a threaded cap which obturates the housing of the calibrated spring and which enables the compression of said latter to be regulated as a function of the pressure of the liquid, so that the valve is stable in two positions.

A valve according to the invention associated with a rapid exhaust valve with a floating flap which is connected to the second way of the valve, constitutes a hydraulic rapid exhaust device which is particularly suitable for water containing impurities, since the quantity of water which passes through the needle valve during exhaust is very small.

The combination of such a hydraulic device and a deformable jack constitutes a hydraulic single effect motor in which the floating flap is connected to the inlet of the jack and the rod controlling the valve is controlled by a pivoting pin stable in two positions which is associated with the jack and rocks at each end of stroke of said jack.

According to another application, a valve according to the invention may be used as hydraulic relay, stable in two positions, with low control effort, placed in a circuit conveying a liquid containing impurities by combining said valve with an end-of-stroke control employing a roller, hydraulic or pneumatic pilot valve, electromagnet or spring.

The invention results in a new three-way hydraulic valve and a new single effect hydraulic motor comprising such a valve.

A first advantage of a valve according to the invention resides in the fact that it may serve to control the passage of a liquid containing impurities. This liquid circulates from the first way through which it arrives to the second way and this circulation is controlled by a ball valve, of relatively large diameter, whose good functioning is not too disturbed by the impurities. The third way serves solely to create a slight leak which is sufficient to provoke the displacement of the floating flap of a rapid exhaust valve associated with the valve so that the quantity of water passing through the seat of the needle is very small, this avoiding fouling of the seat and needle.

The valves according to the invention may be used for controlling the irrigation of water of any nature and in particular waste water from food industries, which contains solid waste.

Another advantage of a valve according to the invention resides in the fact that it is "bistable", i.e. on the one hand the position of opening of the ball valve and of closure of the needle and on the other hand the position of closure of the ball valve and of opening of the needle are two positions of stable equilibrium. It is therefore sufficient to exert thrusts and pulls of short duration on the rod of the valve to cause it to rock from one position of equilibrium to the other. This property is very advantageous and in particular makes it possible to use this valve as hydraulic relay stable in two positions, having a function of memory in association with end-of-stroke contacts issuing solely short pulses without having to continue to exert an effort on the rod of the valve to maintain it open or closed.

Moreover, the effort to be exerted to cause the valve to pass from one position of equilibrium to the other may be very little.

In fact, the effort for opening the valve is equal to the difference between, on the one hand, the product of the pressure P by the surface S of the seat of the ball and on the other hand the thrust F of the calibrated spring. Similarly, the effort for closing the valve is equal to the difference between on the one hand the thrust F of the calibrated spring and on the other hand the product of the surface $s$ of the seat of the needle by the pressure of water P. The valve remains "bistable" as long as $s < F/P < S$.

If the difference between $S$ and $s$ is great, the pressure of water $P$ may vary without the calibration of the spring having to be modified, but the difference between $F/P$ and $s$ or $S$ may become great hence a relatively considerable force to be exerted on the rod controlling the valve to open or close it.

However, one of the movements, for example the movement of opening of ball valve may be preferred and the spring may be compressed so that $F/P$ is very slightly lower than $S$ in which case the force of opening of the ball valve may be very slight.

S and $s$ may also be chosen to be fairly similar so that the two movements of opening and closure of the valve necessitate only a slight effort.

This disposition holds good when the liquid used is of substantially constant pressure, otherwise it requires frequent adjustment of the calibration of the spring.

Another advantage of a valve according to the invention consists in that the control rod is fixed to the centre of a membrane. Said latter protects the spring from any contact with the liquid and thus from any corrosion or oxidation due to this contact.

On the other hand, the control rod is maintained centered by the membrane and does not need to be guided. This arrangement has proved very advantageous for valves equipping land treatment or irrigating apparatus which are used seasonally, as it avoids seizing or clogging of the rod which are inevitably produced, when the rod is guided, after periods of inactivity or when the rod is placed in contact with water containing impurities.

A hydraulic device composed in combination of a valve according to the invention, a rapid-exhaust valve, a deformable jack and a "bistable" rocking lever actuated by the jack and controlling said valve constitutes a single-effect hydraulic motor which is particularly suitable as motor for irrigating apparatus that may be actuated by irrigation water containing a large quantity of impurities.

The invention will be more readily understood on reading the following description with reference to the accompanying drawings, in which:

FIG. 3 is a section through a device for hydraulically controlling a valve according to FIG. 2.

FIG. 4 is a section through a device for controlling the valve according to FIG. 2 by a spring.

FIG. 5 is a section through a device for mechanically controlling a valve according to FIG. 2, associated with an electromagnet.

Figure 1:
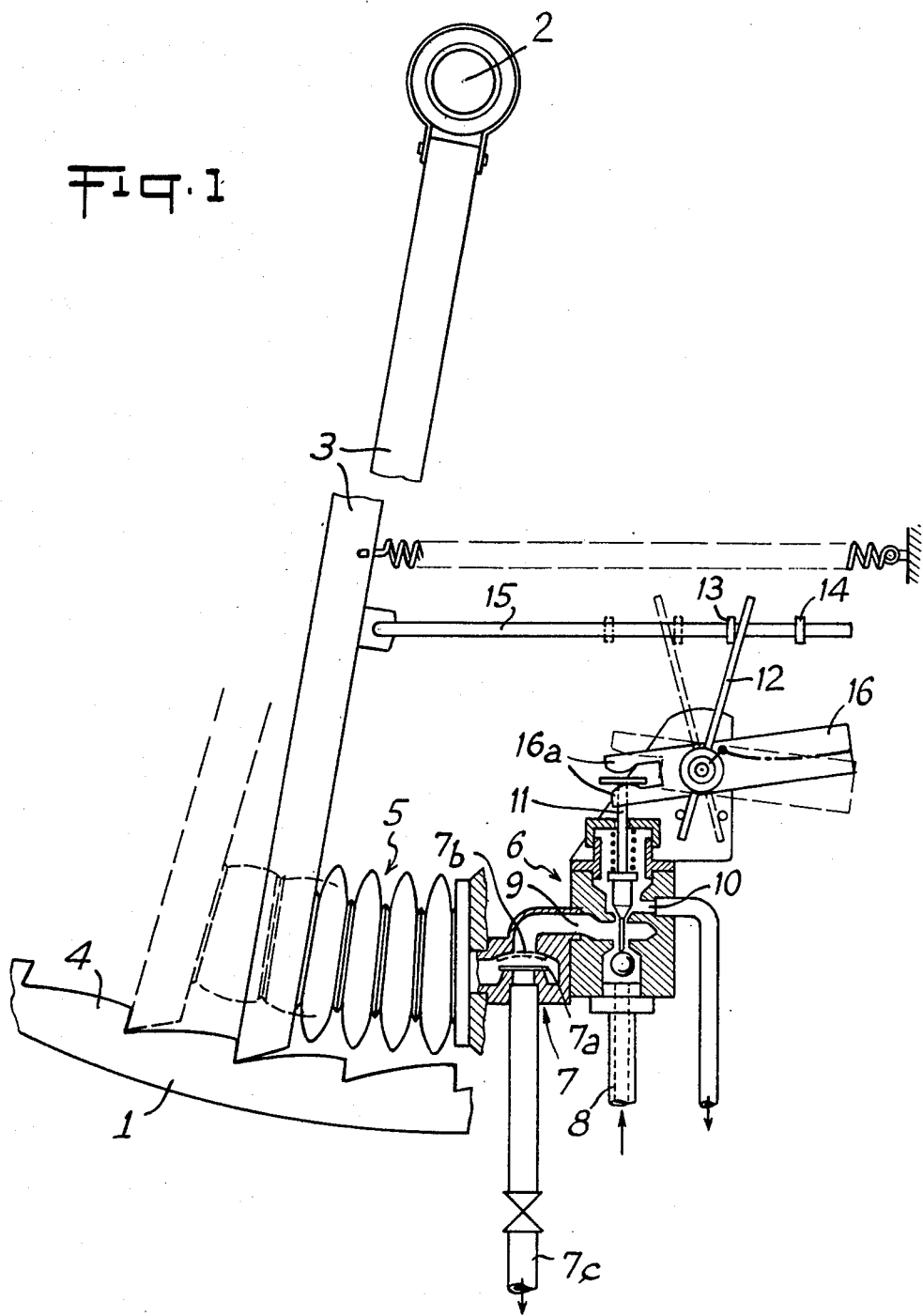
FIG. 1 is a view of one application of a device according to the invention.

Referring now to the drawings, FIG. 1 shows a particular application of a hydraulic device according to the invention. It shows a portion of drum 1 pivotting about a horizontal axis 2. The drum 1 is part of an irrigation apparatus and serves as reel for a flexible hose. It comprises a hydraulic device which drives the drum in step-by-step rotation during irrigation, this enabling an irrigation apparatus placed on a sled drawn by the hose, to be progressively displaced.

This drive device is moved by the irrigation water which may be water containing a large quantity of impurities.

The drive device comprises an arm 3 which pivots about axis 2 and of which the free end meshes in the manner of a pawl on a geared wheel 4 located on the periphery of one of the side walls of the drum.

Such irrigation apparatus are known in which the step-by-step drive motor is constituted by a single-effect hydraulic jack which drives the oscillating arm 3. Such a motor with jack constituted by a piston moving in a cylinder does not function well if the irrigation water contains impurities, which is frequently the case.

Hydraulic drive devices are also known, which are constituted by a deformable jack 5 with which is associated a three-way valve 6 and a rapid exhaust valve 7 with floating flap 7a.

The three-way valve 6 comprises a first way 8 which is connected to the inlet of pressurised water, a second way 9 which is connected to the inlet of the rapid exhaust valve 7, itself connected to the jack 5, and a third way 10 which is an exhaust connected to the atmosphere.

The heretofore used three-way valves are valves having two flaps mounted on the same rod 11, whose manoeuvres are controlled by a rocking lever 12 controlled by stops 13 and 14, fixed on a rod 15 articulated on arm 3. The lever 12 acts on a control finger 16, stable in two positions, which actuates the rod 11.

The device functions as follows.

During the period of drive, the lower flap of the valve 6 is open and it places the water inlet 8 in communication with the jack 5.

The flap 7a of the rapid exhaust valve 7 is closed. The jack 5 deforms and pushes the arm 3 which takes the drum 1 along with it by one step. When the arm 3 arrives at the end of stroke, in the position shown in broken lines, the stop 14 placed on the rod 15 causes the lever 12 to rock into the position shown in broken lines.

The control finger 16 rocks to occupy the position shown in broken lines and the fork 16a located at the end of the finger 16 pulls the rod 11 upwardly. The lower flap of valve 6 closes. The upper flap opens, placing jack 5 in communication with the exhaust 10. The slight flow of water which passes through the valve moves the flap 7a of exhaust valve 7 which comes to occupy position 7b shown in broken lines and the jack finishes draining rapidly through the pipe 7c, returning the arm 3 rearwardly.

The use of a deformable jack 5, composed of rubber bellows instead of a jack with piston, makes it possible to use water containing impurities, at jack level. However, as this water passes through valve 6, the impurities cause rapid wear and tear of the valve and operational defects therein. On the other hand, the valves with two flaps used heretofore require a considerable thrust to maintain the upper flap closed during the inflation of the jack and the opening of the flap must be controlled by a mechanical device capable of exerting a sufficient force which varies with the pressure of the irrigation water.

Figure 2:
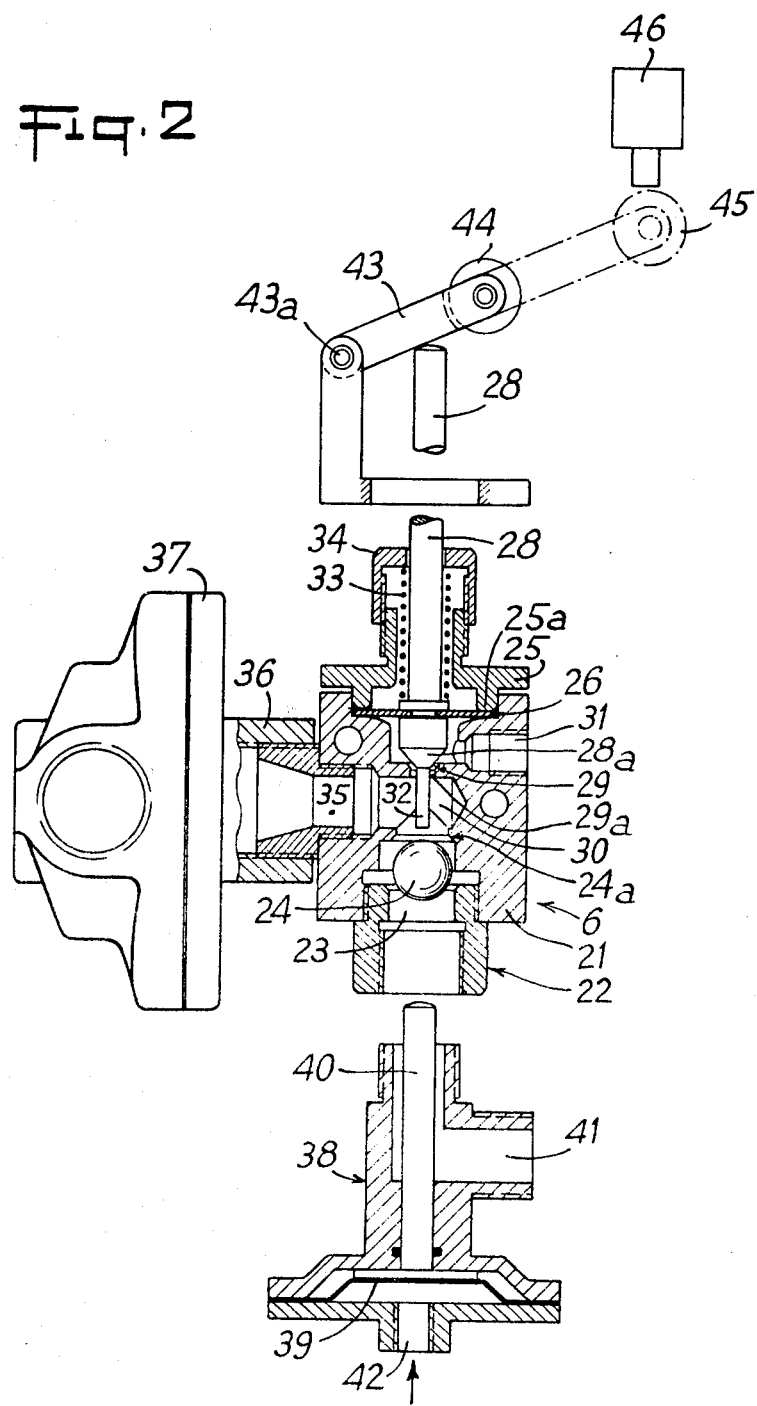
FIG. 2 is a section, on a larger scale, through a three-way valve according to the invention.

FIG. 2 shows a section, on a larger scale, of a valve 6 according to the invention.

This valve comprises a body 21 through which is pierced a first pipe on which is screwed a threaded union 22 which serves for connecting the pressurised water inlet pipe. The body 21 and the connection 22 define a cavity 23 in which is disposed a ball 24 constituting a ball valve normally maintained closed by the pressure of the water which applies the ball 24 to the seat 24a.

In the upper part of the valve 6 there is a cover 25 which comprises, on its inner periphery, an annular rib 25a abutting on the periphery of a deformable membrane 26. This membrane is fixed at its centre on the control rod 28 which extends by a conical needle 28a abutting on a seat 29 having a diameter which is much smaller than the seat 24a. The seat 29 surrounds an opening 29a which places the central cavity 30 of the valve 6 in communication with the exhaust orifice 31. The needle 28a is extended by a rod 32 which abuts on the ball 24 when the needle 28a is resting on the seat 29 and which then maintains the ball valve open. A spring 33 is disposed around rod 28, whose compression may be adjusted as desired by a threaded cap 34 which is screwed onto the cover 25. The compression of the spring 33 is adjusted so that the thrust thereof is slightly lower than that which is necessary for compensating the thrust of the water on the ball 24 when the ball valve is closed, so that a very slight supplementary effort is sufficient to open the ball valve and close the needle. The thrust of the spring is sufficient to maintain the needle closed until an effort in the opposite direction opens it and it is then maintained open by the thrust of the water on the ball. The open and closed positions of the ball valve are positions of stable equilibrium and it suffices to exert forces on the rod 11 to pass from one position to the other.

The membrane 26 protects the spring 33 from any contact with water. The fixation of the control rod 28 on a membrane 26 eliminated any friction of the rod on the walls of a sleeve guiding the rod and therefore avoids any seizing of the rod 28. This advantage is particularly advantageous for valves with which seasonal irrigative apparatus, which remain unused for long periods of time, are equipped.

The central cavity 30 of the valve 6 communicates with a third way 35 on which is connected a union 36 of the body 37 containing the rapid exhaust valve 7.

FIG. 2 shows, associated with the valve 6, a hydraulic locking device 38 composed of a deformable membrane 39 associated with a sliding rod 40.

The pipe 41 is the inlet pipe 8 of FIG. 1 for irrigation water. The pipe 42 represents an inlet for pressurised water acting on the membrane 39 so that the rod 40 maintains the ball 24 in closed position, this enabling the device to be locked when not in operation.

The top part of FIG. 2 shows a control by roller of the valve 6 used as end of stroke. A lever 43, articulated about an axis 43a, carries at its end a roller 44 on which a mobile member acts at the end of stroke. The lever 43 rests on the end of the rod 28 and causes the ball valve 24 to open. In this application, the valve 6 is used as hydraulic relay which has the advantage of being actuated at low energy cost and may be used in automatic hydraulic circuits functioning with a liquid containing impurities.

A variant has been shown in broken lines in which the arm 43 comprises a roller 45 on which acts an electromagnet 46 which is itself excited by the closure of an end-of-stroke switch. This variant enables electromagnetic circuits and hydraulic circuits to be associated in the same automatic device.

FIG. 3 shows a variant embodiment of the control of the opening of the valve 6 by a hydraulic control valve 47 comprising a deformable membrane 48 fast with a pusher 49 which acts on the end of the rod 28.

FIG. 4 shows another variant in which a mechanical pusher 50 is held in abutment on the end of the rod 28 by a pin 51 which locks the pusher 50 in a position where the spring 52 is pre-stressed in tension or in compression so that the action of tearing away the pin 51 brings about either the closure of the ball valve or the opening thereof. For example, the valve is used as automatic discharge valve of an irrigation hose when the sled carrying the irrigation apparatus is at the end of its run. In this case, it is the arrival of the sled which causes the pin 51 to be torn away.

FIG. 5 shows on a larger scale a reverser pin 16, stable in two positions, of the same type as the reverser pin of FIG. 1 comprising at one end two forks 16a acting on the end of the rod 28 of the valve 6.

The finger 16 pivots about an axis 53. It comprises, inside, a spring 54, one end of which is displaced by the lever 12 on which acts an alternate displacement member, e.g. the rod 15 connected to the oscillating arm 3 of FIG. 1.

As a variant, the action of the oscillating arm may be replaced by that of an electromagnet 55 acting on the free end of the finger 16. This variant makes it possible to control the reversals of movement of the jack 5 by electrical end-of-stroke switches. The electro-magnet is supplied by a battery.

I claim:

1. A three way hydraulic valve intended for distributing a liquid containing impurities, comprising: a housing having first inlet way formed therein for said liquid and second and third liquid outlet ways formed therein, said housing having a valve seat formed therein located between said first and second ways and a valve seat located between said second and third ways, a ball valve located in said first way for engagement with said seat between said first and second ways solely under the influence of the pressure of said liquid in said first inlet way; a conical needle valve in said housing; spring means for biasing said needle valve on said seat located between said second and third ways, said seat for the needle valve having an orifice of a diameter smaller than that of the orifice of the seat of said ball valve, and means for adjusting the compression of said spring so that the force it exerts is lower than the thrust necessary for opening the ball valve when it is maintained closed by the pressure of liquid in said first way and greater than the thrust exerted by the liquid on the needle valve when it is closed, so that said valve is stable in two positions; a maneuvering rod outside the valve body operatively connected to said needle valve, said needle valve including an extension abutting on said ball and maintaining it open when the needle valve is closed.

2. A valve as claimed in claim 1 wherein said adjusting means comprises a threaded cap secured to said housing and operatively engaged with said spring means for adjusting the compression of said spring means as a function of the pressure of the liquid so that the valve is stable in two positions.

3. A valve as claimed in claim 1 including a rapid exhaust valve having a floating flap valve connected to said second way of said valve housing.

* * * * *